United States Patent
De Souza et al.

(12)

(10) Patent No.: US 6,332,434 B1
(45) Date of Patent: Dec. 25, 2001

(54) HYDROGEN GENERATING APPARATUS AND COMPONENTS THEREFOR

(75) Inventors: Mario De Souza; Gabi Balan, both of Medicine Hat (CA)

(73) Assignee: FatPower Inc., Calgary (CA)

( * ) Notice: Subject to any disclaimer, the term of this patent is extended or adjusted under 35 U.S.C. 154(b) by 0 days.

(21) Appl. No.: 09/628,134

(22) Filed: Jul. 28, 2000

Related U.S. Application Data

(63) Continuation-in-part of application No. 09/106,549, filed on Jun. 29, 1998.

(30) Foreign Application Priority Data

Oct. 25, 1999 (CA) .................................................. 2287270

(51) Int. Cl.[7] .............................................. F02B 43/08
(52) U.S. Cl. .................................................... 123/3
(58) Field of Search ...................... 123/3, 1 A, DIG. 12

(56) References Cited

U.S. PATENT DOCUMENTS

| | | | | |
|---|---|---|---|---|
| 3,939,806 | * | 2/1976 | Bradley | 123/3 |
| 4,271,793 | * | 6/1981 | Valdespino | 123/3 |
| 4,332,219 | * | 6/1982 | Gonzalez | 123/3 |
| 4,773,981 | * | 9/1988 | Bidwell | 123/DIG. 12 |
| 5,231,954 | * | 8/1993 | Stowe | 123/3 |
| 5,513,600 | * | 5/1996 | Teves | 123/3 |
| 6,209,493 | * | 4/2001 | Ross | 123/3 |

* cited by examiner

Primary Examiner—Marguerite McMahon
(74) Attorney, Agent, or Firm—Bennett Jones LLP

(57) ABSTRACT

A hydrogen generating system is provided for use in internal combustion engines for increasing the efficiency of the engine and decreasing emissions from the engine. The hydrogen generating system has an electrolysis cell for generating hydrogen and oxygen gases by electrolysis of an aqueous solution, a power source for providing electrical power to the electrolysis cell, an outlet flow means for introducing the generated gases into the intake manifold system of an internal combustion engine, a monitoring means for monitoring the operating conditions of the hydrogen generating system, and a control means connected to the monitoring means for controlling the operation of the hydrogen generating system in response to the monitoring means. The invention is also directed to a controller for controlling a hydrogen generating system for use in an internal combustion engine for increasing the efficiency of the engine and decreasing emissions from the engine. The controller has at least one interface means for receiving information on the operating conditions of the hydrogen generating system, at least one control means for controlling a parameter of the hydrogen generating system, and a logic circuit connected to the interface means and control means for providing instructions to the control means in response to the information received from the interface means.

20 Claims, 5 Drawing Sheets

US 6,332,434 B1

HYDROGEN GENERATING APPARATUS AND COMPONENTS THEREFOR

This is a continuation-in-part of U.S. application Ser. No. 09/106,549 filed Jun. 29, 1998, the contents of which are hereby incorporated by reference in their entirety.

FIELD OF THE INVENTION

The present invention is directed to a hydrogen generating apparatus and in particular a hydrogen generating apparatus for use in motor vehicles to increase the performance of the engine of the motor vehicle. The present invention is also directed to components useful in the hydrogen generating apparatus.

BACKGROUND OF THE INVENTION

The use of hydrogen as a supplemental fuel in motor vehicle engines has been proposed to increase the performance of the engine. Hydrogen and oxygen, when used as part of the air/fuel mixture for the operation of the engine, have been found to increase the performance of the engine by increasing the mileage and by reducing the amount of emissions from the engine. The hydrogen and oxygen may be generated through electrolysis of an aqueous solution with the gases given off being mixed with the charge of fuel and air supplied to the engine.

The generation of small quantities of hydrogen and oxygen using an electrolysis cell with the hydrogen and oxygen generated then being combined with the usual air/fuel mixture to improve the efficiency of internal combustion engines has been proposed in a number of prior patents. Some systems of these prior patents utilized the alternator or an auxiliary generator attached to the engine to provide the electrical power for the system.

One example of such a system is shown in U.S. Pat. No. 4,271,793. This patent describes an internal combustion engine having a fuel system for feeding an air/fuel mixture to the combustion chamber and an electrical generation system, such as an alternator. An electrolysis cell was attached adjacent to the engine to generate hydrogen and oxygen upon the application of a voltage between the cathode and the anode of the electrolysis cell. A gas feed connected the cell to the engine fuel system for feeding the hydrogen and oxygen to the engine combustion chambers. The electrolysis cell was placed under a predetermined pressure to prevent the electrolyte from boiling off. The cell also included a cooling system and other safety features.

Another electrolysis cell is disclosed in U.S. Pat. No. 5,231,954. The electrolysis cell of this patent was used for generating hydrogen and oxygen gases which were added to the fuel delivery system as a supplement to the gasoline or other hydrocarbons burned therein. The cell was designed to reduce the hazard of explosion by withdrawing the gases through a connection with the vacuum line of the positive crankcase ventilation (PCV) system of the engine and by utilizing a slip-fitted top cap for the electrolysis cell.

A further example of an electrolysis cell for use in connection with an internal combustion engine, for generating hydrogen and oxygen gases is shown in U.S. Pat. No. 5,458,095. This system utilized an electric pump to draw the hydrogen and oxygen gases out of the cell, where the outlet side of the pump was connected to the air intake manifold using a hose having a terminating insert. The insert was formed from copper tubing bent at an appropriate angle to insure that the hydrogen and oxygen gas outlet from the pump was in the same direction as the downstream airflow in the air intake manifold.

SUMMARY OF THE INVENTION

The present invention is directed to a hydrogen generating system for use in internal combustion engines for increasing the efficiency of the engine and decreasing emissions from the engine. The hydrogen generating system of the present invention comprises an electrolysis cell for generating hydrogen and oxygen gases by electrolysis of an aqueous solution, a power source for providing electrical power to the electrolysis cell, an outlet flow means for introducing the generated gases into the intake manifold system of an internal combustion engine, a monitoring means for monitoring the operating conditions of the hydrogen generating system and the internal combustion engine, and a control means connected to the monitoring means for controlling the operation of the hydrogen generating system in response to the monitoring means.

In an aspect of the invention there is provided a controller for controlling a hydrogen generating system for use in an internal combustion engine for increasing the efficiency of the engine and decreasing emissions from the engine. The controller comprises at least one interface means for receiving information on the operating conditions of the hydrogen generating system or the internal combustion engine; at least one control means for controlling a parameter of the hydrogen generating system; and a logic circuit connected to the interface means and control means for providing instructions to the control means in response to the information received from the interface means.

BRIEF DESCRIPTION OF THE DRAWINGS

Preferred embodiments of the present invention are illustrated in the attached drawings in which.

DETAILED DESCRIPTION OF THE PREFERRED EMBODIMENT

Figure 1:
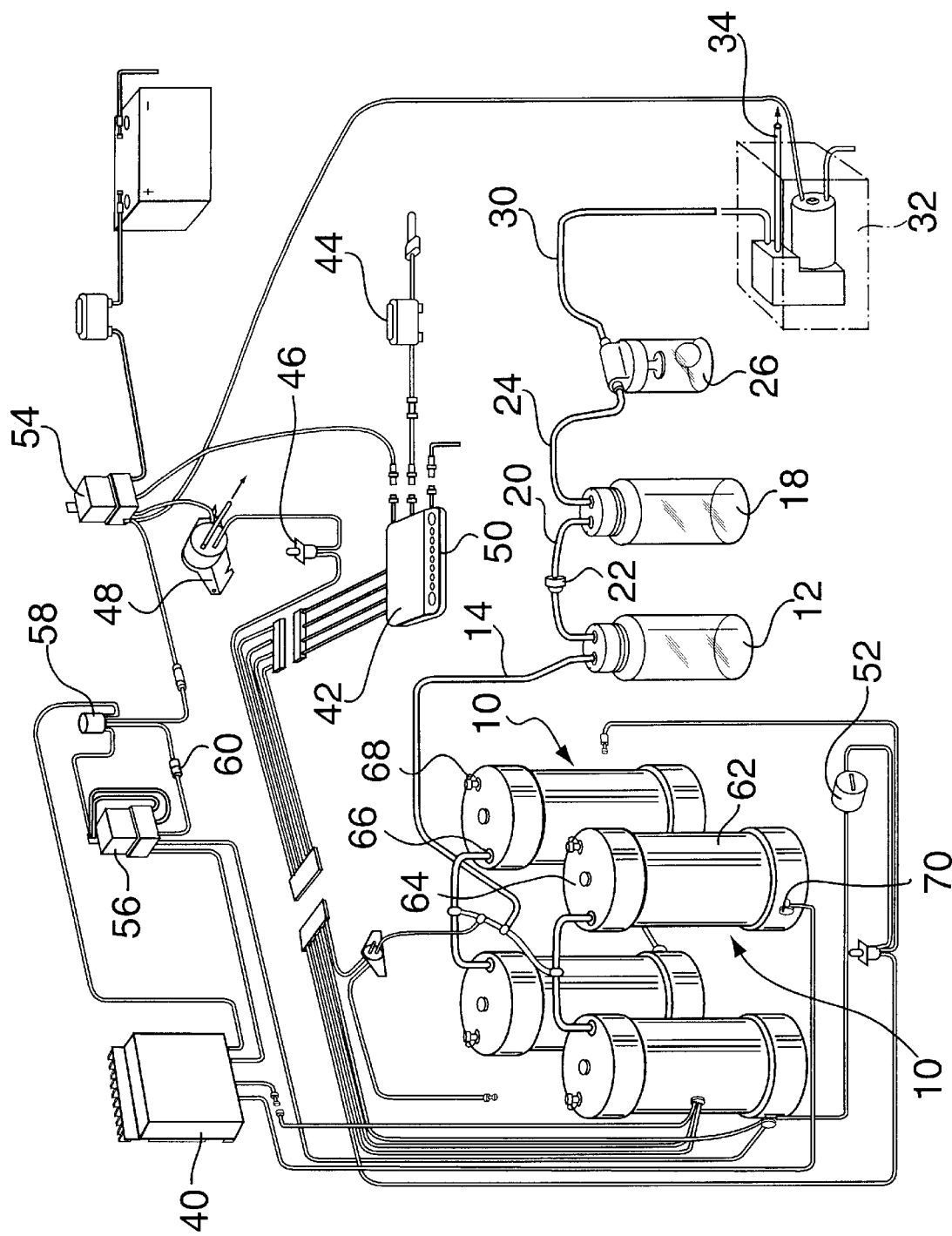
FIG. 1 is a perspective view of a preferred embodiment of the hydrogen generating system of the present invention.

A preferred embodiment of a hydrogen generating system of the present invention is illustrated in FIG. 1. The hydrogen generating system includes one or more electrolysis cells 10 which are used to generate the hydrogen and oxygen gases by electrolysis of a suitable aqueous medium. In the embodiment illustrated in FIG. 1, four such electrolysis cells 10 are utilized, however other numbers of cells are possible. The number of cells 10 utilized in the system depends upon the capacity of the cell 10 for generating hydrogen and the requirements of the engine to which the system is attached. Thus for passenger cars and light duty trucks utilizing gasoline engines, one or two cells 10 each having a capacity up to about 500 $cm^3$ of hydrogen per minute would be utilized. For heavy duty trucks and other heavy equipment, especially those utilizing diesel engines, four, six or eight cells 10 each having a capacity up to about 1000 $cm^3$ of hydrogen per minute are preferred.

The gases generated by the electrolysis cells 10 are fed through a moisture collector 12 which is connected to the cell 10 by a suitable tubing 14. The output of the moisture collector 12 is connected to a gas scrubber 18 by means of a suitable tubing 20 which is provided with a check valve 22 to prevent back flow of fluids. From the gas scrubber 18 the gases flow through tubing 24 to an automatic safety shut-off collector 26 which has a ball float valve which shuts off the flow of gas if the liquid level in the shut-off collector 26 rises to the top of the collector 26.

The output of the shut-off collector 26 is connected through tubing 30 to a low flow vacuum pump 32 which pumps the gases to a suitable part of the intake system of the engine and is adjustable to regulate the flow of the gases. The gases may be injected by the pump 32 into the intake system of the engine before the carburetor or injector by connecting the tubing 34 on the outlet of the pump 32 to the air breather box of the intake system of the engine upstream from the air filter. Alternatively the gases may be injected directly into the carburetor or other fuel delivery system of the intake system of the engine or may be injected into the intake manifold of the intake system after the carburetor or fuel delivery system if a proper filtering system is provided.

As illustrated in FIG. 1 the hydrogen generating system of the present invention includes suitable control and monitoring means provided in the preferred embodiment by an electronic process controller 40. The controller 40 provides for control of the operation of the hydrogen generating system to provide for maximizing efficiency under all conditions of operation of the engine as well as monitoring the system to provide for safe operation. For example, one parameter of operation of the hydrogen generating system which is preferably monitored by the controller is the level of electrolyte solution in the electrolysis cells 10. As described in detail below, the electrolysis cells 10 are preferably provided with a level sensor which provides feedback to the controller 40 on the level of electrolyte solution in the electrolysis cell 10. If the level of the electrolyte solution in the electrolysis cell 10 drops to a level which would cause enough exposure of the electrodes of the cell, the cell could be damaged or production of gases becomes inefficient. In this situation, the controller 40 will shutdown operation of the hydrogen generating system. Other parameters of the hydrogen generating system controlled by the controller 40 will be explained in detail below.

The hydrogen generating system is also provided with a dash module 42 which is mounted in the motor vehicle in a location easily accessible by the operator of the motor vehicle. The dash module 42 allows the operator of the motor vehicle to control and monitor the hydrogen generating system as required or desired. The dash module 42 is connected to the ignition of the motor vehicle with a suitably sized fuse 44.

For safety reasons, the hydrogen generating system is also provided with one or more safety shutoff switches 46 which will shutdown the system. The engine compartment is provided with a shutoff switch 46 mounted such that raising the hood of the engine compartment will cause the switch 46 to open and shutdown the hydrogen generating system. If the hydrogen generating system is mounted in the trunk compartment a second shutoff switch 46 would also be located there such that raising the hood of the trunk compartment will shut off operation of the system.

The hydrogen generating system of the present invention also includes a means of determining that the engine is running so that if power is applied to the controller 40 but the engine is not actually running, no electrolysis will take place. The means to determine that the engine is running could be a sensor monitoring one or more of the engine conditions when the engine is operating. For example, a sensor could be used to monitor vacuum or oil pressure which is present in an operating engine. Preferably, for gasoline engines, a vacuum safety switch 48 is utilized to insure that the engine is running, while for diesel engines, the sensor is preferably an oil pressure switch. The vacuum safety switch 48 monitors the vacuum, preferably from a different source than the vacuum intake line to the engine. While there are numerous sources of vacuum on the engine, the preferred source for monitoring of engine vacuum is the heater vacuum line. The vacuum safety switch 48 is adjusted such that should the level of engine vacuum drop below a preset level, the safety switch 48 will interact with the electronic process controller 40 to shut down the hydrogen generating system.

The hydrogen generating system is also provided with a first relay or solenoid 54 which is operated by the various switches, such as the dash module 42, oil pressure switch or vacuum safety switch 48 and hood trunk switch 46 to provide for the activation and deactivation of power to the electronic process controller 40 and in turn the electrolysis cell 10 and vacuum pump 32 of the hydrogen generating system. In a preferred embodiment the relay 54 may be incorporated into the electronic process controller 40 as described in detail below.

The hydrogen generating system preferably also provides for visual feedback to the operator of the motor vehicle. The dash module 42 may be provided with one or more LED displays 50, for example one LED display indicating when the power is turned on to the system, and a second LED display to indicate trouble with the system, such as for example, if the level of electrolyte in the electrolysis cell 10 decreases to a level to cause potential problems. Preferably, the system is provided with a display module which would include a alphanumeric display, which can display system messages provided by the electronic process controller 40. For example, as described in detail below, on operation of the system after the ignition is turned on, the electronic process controller 40 could perform a system scan for proper operation of the components of the system and display various messages on the alphanumeric display.

The hydrogen generating system of the present invention has a number of safety features built in. As noted above, one such feature is the detection of the level of electrolyte in the electrolysis cell 10. If the level of the electrolyte is below a specified limit, then a warning would be displayed to advise the operator to add fluid, preferably steam distilled water, to the cell 10. If the fluid is not added and the level is not brought up above the limit within a set period of time, the electronic process controller 40 would shut the system down and indicate the system failure. To provide an indication of the length of time the system is operating, an hour meter 52 is connected to the electrolysis cells 10, to monitor the operating time of the cells 10.

Another monitoring routine of the system could be the temperature of the electrolyte solution in the electrolysis cell 10. If the temperature of the fluid in the cell exceeds a certain limit, boiling of the electrolyte solution may occur or the cell may be damaged. The safety temperature limit is set according to many factors, such as, cell design and capacity, expected operating conditions and the nature of the electrolyte solution. Preferably with the design of the preferred embodiment described below, the temperature of the electrolyte in the electrolysis cell 10 should not exceed 160° F. In order to monitor the temperature in the cell, a temperature probe may be provided to provide a feedback on the electrolyte solution temperature. If the temperature increases above a preselected set point, the electronic process controller 40 could limit the current to the cell 10 to reduce the amount of electrolysis taking place, and thereby reduce the temperature of the cell 10. Should the temperature not reduce or continue to rise above the set point, the electronic process controller 40 could shut down the electrolysis cell 10 by disrupting the power being provided to the cell 10 and restore functioning of the system once the appropriate temperature is attained.

The hydrogen generating system of the present invention also monitors the engine operation through the oil pressure or vacuum safety switch 48, as described above. If the engine vacuum or oil pressure drops below a preset level, then the electronic process controller 40 will shut down the system. In addition, as the preferred embodiment of the present invention utilizes the vacuum pump 32, the process controller 40 could also monitor the operation of the vacuum pump 32, particularly with respect to the electrical power being provided to the pump 32. Should the electric circuit to the pump 32 be interrupted, then the electronic process controller 40 will shut down the system by stopping the electrical power supplied to the electrolysis cell 10. In addition, should the gas supply line of the gases generated by the electrolysis cell 10 become blocked such that the pressure in the line increases, then the electronic process controller 40 will sense that through the pump circuit and shut down the power supplied to the electrolysis cell 10.

When the electronic process controller 40 shuts down the operation of the electrolysis cells, it is preferred if the residual energy stored in the cells 10 be removed. This is preferably accomplished by a second relay 56 in conjunction with a capacitor 58 and resistor 60. When the power to the electrolysis cell is removed by the electronic process controller, the relay 56 is activated and connects the cells to ground to bleed off any residual energy stored in the cells 10.

The electrolysis cell 10 utilized in the hydrogen generating system of the present invention is preferably the cell described in detail in PCT Application No. CA99/00590, filed Jun. 29, 1999, the disclosure of which is hereby incorporated by reference. Electrolysis cell 10, preferably has a cylindrical shaped case 62, constructed of a suitable material which would be inert to the electrolyte solution and would not be affected by the voltages or temperatures encountered in the electrolysis cell 10. The case 62 should also preferably have a co-efficient of expansion which does not cause significant expansion of the dimensions of the cell 10 under the operating conditions of the hydrogen generating system. Preferably, the case 62 of the electrolysis cell 10 is a polyvinyl chloride.

The electrolysis cell 10 is provided with a cap 64 which is welded to the sidewall once the components of the electrolysis cell have been assembled. The cap 64 is provided with an outlet 66 to which the tubing 14 is connected. Cap 64 is also provided with a fill plug 68 which is removable to allow the addition of distilled water or electrolyte solution to the cell as the level of fluid in the electrolysis cell 10 decreases. Preferably, the fill plug 68 also incorporates a pressure release mechanism to provide for relief of the pressure within the cell 10 should the interior pressure increase beyond a set limit.

The electrolysis cell 10 is provided with an electrode assembly which is described in detail in PCT Application No. CA99/00590. The electrodes that make up the electrode assembly are provided as a monocell monopolar assembly of an anode and a cathode. The outside cathode and anode electrode plates are provided with an adapter for electrical connection to the positive and negative supply from the motor vehicle electrical system. When the electrode assembly is placed within the case the adapters are in alignment with terminal 70.

The electrode assembly provides for a monocell monopolar electrode assembly for increased efficiency of the electrolysis reaction in the electrolysis cell 10. The materials from which the electrode assembly is constructed are selected to minimize the effects of different coefficients of expansion of the materials, withstand strong corrosive action of the electrolyte solution and provide effective and efficient electrolysis process. Thus, preferably, the electrode plates are a suitable stainless steel material, most preferably nickel plated stainless steel.

The electrolyte solution utilized within the electrolysis cell 10, is preferably a basic aqueous solution to provide for increased efficiency of the electrolysis reaction. Preferably, the solution is also adjusted to remain in solution form and not freeze at extremely low temperatures, down to −40° or more. Most preferably, the electrolyte solution is a 20 to 30% KOH solution. The solution within the gas scrubber 18 is preferably a silicate free solution with a viscosity to allow the bubbles to break to the surface quickly and not accumulate within the solution.

Figure 2:
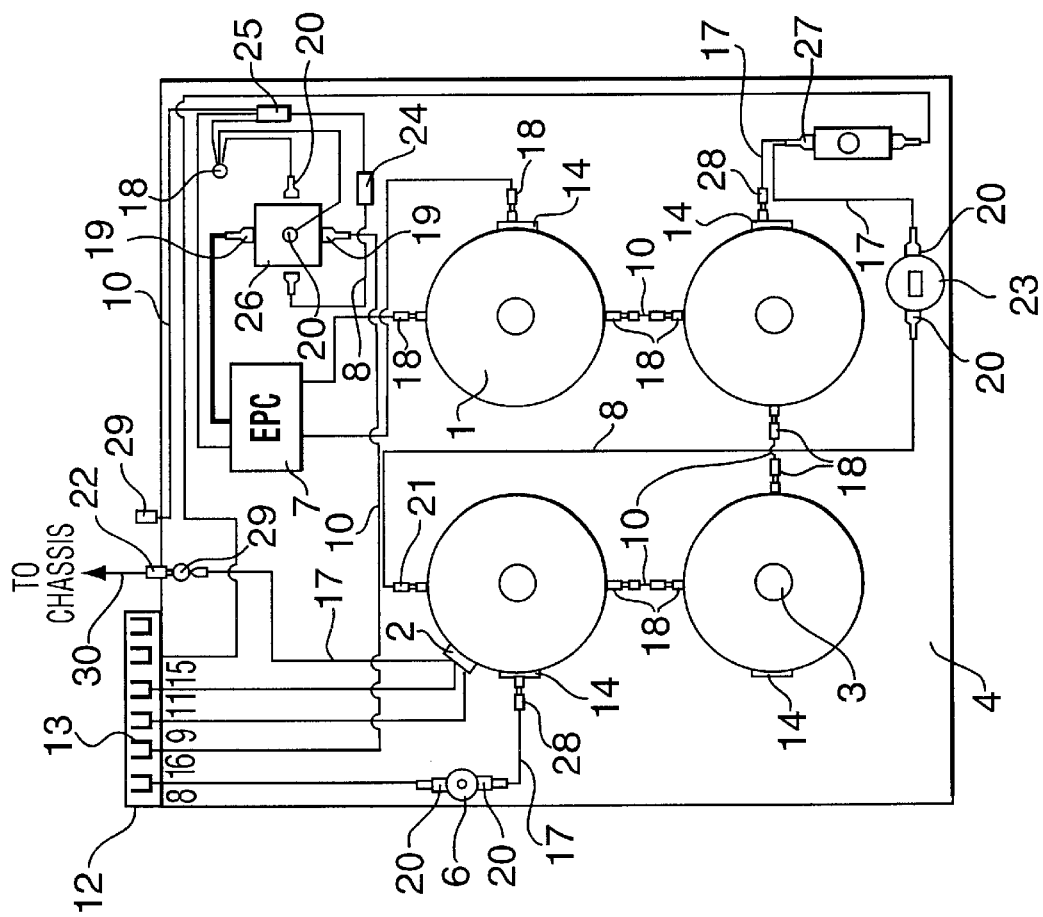
FIG. 2 is a top plan view of a gas generator box of the hydrogen generating system of the present invention.

It is preferred for ease of installation and increased safety that the hydrogen generating system of the present invention be provided as a modular apparatus as illustrated in FIG. 2. In this preferred embodiment, the system includes a gas generator box which contains the electrolysis cells, the power source, and a block of sensors to monitor operation of the electrolysis process. The intelligent electronic process controller, a pump module, and a block of sensors mounted on the vehicle/chassis are provided as separate modules. The box is provided with a closable and lockable lid and is also provided with a safety switch which shuts down the system if the lid is opened.

By adopting a modular structure for the hydrogen generating system, installation of the system is simplified as the gas generator may be easily installed and connected to the other components. By providing the gas generator in its own box, the electrolysis cells may be shielded for potential damage from impact in the event that the vehicle is involved in an accident. The use of the gas generator box also allows for ease in varying the number and size of electrolysis cells to match the requirements specific to every individual application. The size and total number of cells installed in the gas generator box defines maximum capacity of hydrogen/oxygen rates and this is a function of engine size and its operating parameters. For smaller engines the system is provided with only one cell, larger engines may demand a multitude of such cells connected in series, allowing operation at lower current values.

The gas generator box also includes a controlled, regulated power supply preferably a DC-DC power converter working in current limit with a logic interface is the main component of this device. This power supply is capable of varying the current output to a profile supplied by the intelligent process controller, which will result in optimum hydrogen and oxygen quantities being produced and then delivered to the engine. This allows output of system to be adjusted to optimum profiles, according to the demand.

A set of sensors is installed in the gas generator box to monitor operation of the hydrogen generating system as described above. Such sensors monitor one or more of temperature, vacuum, voltage current, temperature and pH. The information is sent via an appropriate wiring harness to the electronic process controller.

An automatic filler may also be provided to supply the necessary water to the electrolysis cells in order to increase the autonomy of operation of this system. The operation of this filler is controlled by the electronic process controller in response to the level sensor and is preferably provided with a means of heating the water during the winter.

The hydrogen generating system of the present invention is commanded, monitored and controlled by the electronic process controller. This device consists of at least the following parts:

an internal power module which supplies power to the internal circuits of the electronic process controller and to the sensors, and a logic module including interfaces, a microcontroller and volatile or non-volatile memory.

The interfaces are one or more interfaces to interface the sensors to the electronic process controller. The interfaces may include A/D converters to convert analog signals to digital signals, a multiplexer to expand the number of channels that can be monitored and an engine scanner/computer engine interface to allow the electronic process controller to read the engine's operating parameters (rpm's, speed, mass air flow, throttle position, etc.) and read and write into engine's computer (injector's pulse width, valve timing, ignition timing, etc.).

The volatile or static memory includes an EPROM storing the software subroutines for the microcontroller. The microcontroller reads all the information and defines the output profile for the power source. This controller can work in both open/closed loops, Various output profiles for the power source can be stored in the EPROM and in this case the electronic process controller matches these profiles to the instant signal set received. The electronic process controller may also have a "smart" regime similar to the devices that use artificial intelligence. In this case the electronic process controller changes the output to the power supply in a sequential manner reading the signal set and adjusting for optimal efficiency. Using this 'self-governing' mode is recommended mainly because the electronic process controller can actually determine the best output profile specific to every particular engine and duty cycle.

The electronic process controller may also be provided with the following optional components:

a data-logger to assist the microcontroller in monitoring performance of the hydrogen generating system and the engine/vehicle, a display module (preferably as part of the dash module) to provide a text or graphical interface displaying performance data and troubleshooting information related to operation of the engine, and of the hydrogen generating system, and a downloading interface to allow data transfer from the electronic process controller's memory to conventional or specialized computers.

Figure 3:
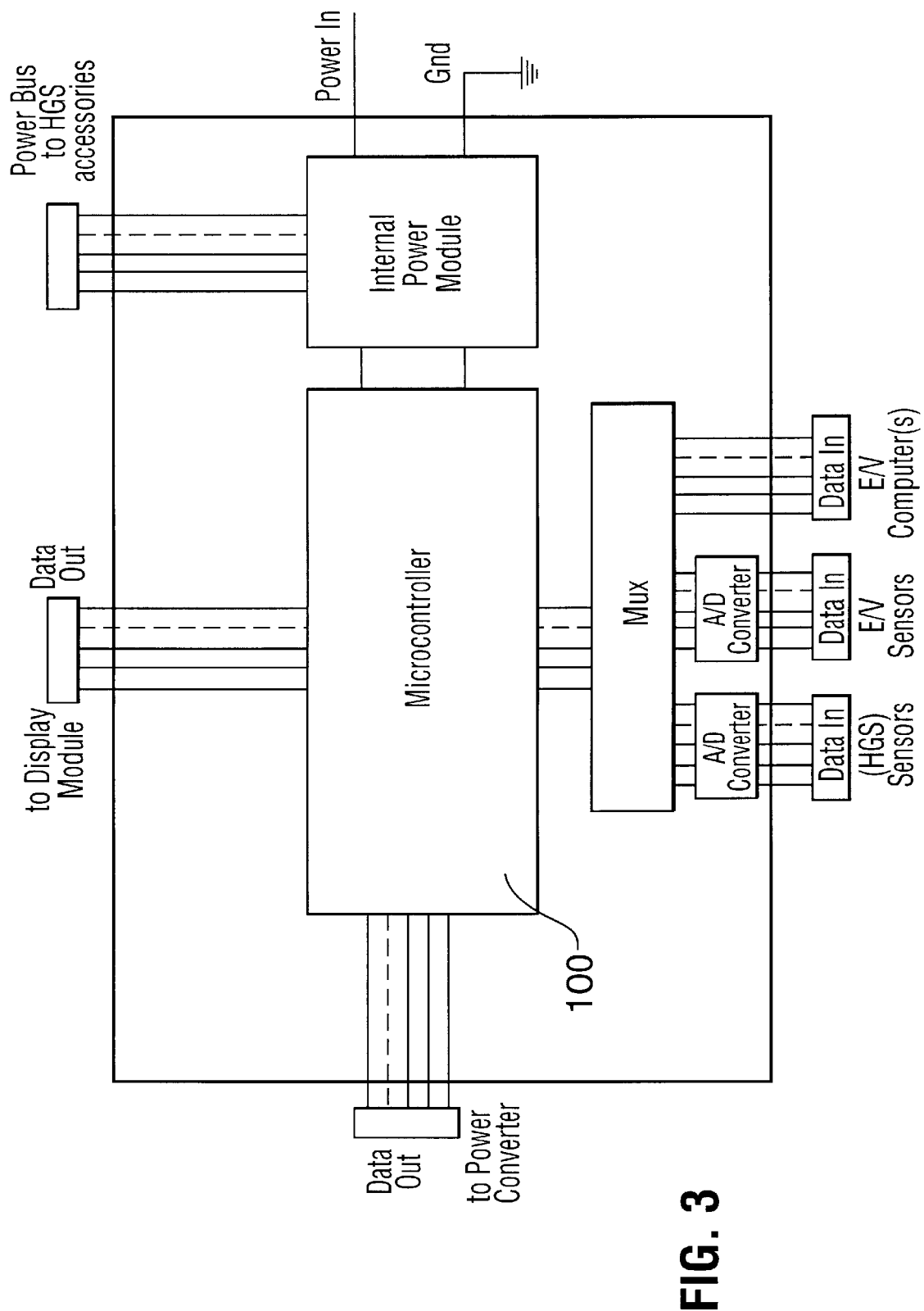
FIG. 3 is a block diagram of the electronic process controller of the hydrogen generating system of FIG. 1.

A preferred embodiment of the controller 40 of the present invention is illustrated in block diagram in FIG. 3. The controller 40 is provided with a logic circuitry 100 to control the operation of the controller. Logic circuitry 100 includes the programmed instructions for operation of the controller preferably stored within a non-volatile memory which may be part of the logic circuitry 100 or may be provided as a separate component of the controller 40. Controller 40 also includes suitable interfaces for interfacing the logic circuitry 100 to the sensors and switches of the hydrogen generating system. Depending upon the nature of the sensor or switch, the interface may be a simple interface to communicate to the logic circuitry that a signal is or is not present from the sensor or switch or the interface may provide an indication of the signal level from the sensor or switch.

For example, for sensors which provide a digital output, such as a TTL level sensor used as a fluid level sensor in the electrolysis cell 10, the output of the sensor could be directly connected to the logic circuitry. The signal could be converted into a "0" or "1" logic signal. The level of the fluid inside the electrolysis cell is then considered to be "full" or "not full". When a "not full" signal is present, the logic circuit will extrapolate the results to estimate the actual level of electrolyte inside the cell as described below.

Other sensors may provide a variable output depending upon the conditions being monitored such as a temperature sensor whose output varies in direct proportion to the temperature sensed. In these circumstances, the interface is preferably an analog/digital converter which converts the level of the signal from the sensor to a digital word which may them be processed by the logic circuitry 100. The non-volatile memory would include digital words corresponding to predetermined levels for the signals from the various sensors to enable the logic circuitry to determine if the signal is within acceptable ranges and hence whether the component of the hydrogen generating system is operating within an acceptable range.

The controller 40 is also provided with a power circuit to regulate the electrical power provided to the electrolysis cell. The controller 40 is connected to the electrical system of the motor vehicle to provide a source of electrical power for operation of the hydrogen generating system. A voltage sensing block is connected to the electrical power input to allow the logic circuit to measure and possibly compare voltage drops. The power circuit has an output to provide electrical power to the electrolysis cell at the proper level, the level of electrical power being under the control of the logic circuitry which interfaces with the power circuit. The amount of power supplied to the electrolysis cell controls the electrolysis reaction. As the amount of power being supplied is controlled by the controller, the controller can regulate the electrolysis reaction in response to monitored conditions including engine demand.

The controller may optionally be provided with variable power regulator for the pump to enable the logic circuitry to regulate the electrical power provided to the pump, and hence the flow rate of the pump, if a pump is included as part of the system. In addition in those systems which utilize a variable flow control valve, the controller may be able to control the flow setting of the valve by means of an interface between the logic circuitry and the flow control valve. Another option available would be in those systems in which the output gases of the electrolysis cell are separated before introduction into the intake system of the motor vehicle. In those situations, the amount of one or both of the gases in the mixture being provided to the engine could be regulated. Preferably, the mixture of gasses would be controlled by controlling the amount of oxygen in the mixture. This could be accomplished by providing an oxygen valve which would be controlled by the logic circuitry through an interface to regulate the amount of oxygen in the mixture. The excess oxygen produced by the electrolysis cell could be vented to the external environment.

Many later model motor vehicles utilize on-board controllers or computers to control various parameters of the operation of the engine of the motor vehicle particularly with respect to controlling exhaust gas pollution. For example, many vehicles are provided with sensors to determine the makeup of the exhaust gases or the fuel/air mixture being introduced into the engine. The on-board controller is capable of controlling the fuel/air mixture in response to monitored conditions to attempt to minimize as much as possible the amount of pollutants in the exhaust gas of the engine.

As illustrated in FIG. 3 the controller 40 of the present invention is preferably provided with an interface for the on-board controller to receive signals from the on-board controller as well as to provide signals to the on-board controller. For example, as the gases being generated by the electrolysis cell and introduced into the intake system of the engine would be high in oxygen content, such that an on-board controller that was monitoring oxygen content of either the fuel/air mixture or the exhaust gas may determine that the fuel/air mixture is too lean and may attempt to regulate the mixture to make it richer. In this situation, the controller 40 could provide a signal to the on-board controller to tell it that the high oxygen level is from the electrolysis reaction and not to adjust the richness of the mixture. The interface between the controller 40 and the on-board controller could also be utilized to monitor engine conditions to enable the controller 40 to control the electrolysis reaction depending upon engine conditions and demand. Thus under high load conditions, the rate of electrolysis could be increased to increase the efficiency of the engine under high demand typical combustion conditions. In idle conditions the combustion would require different hydrogen amounts.

The controller 40 is also provided with an interface for a display module which is preferably provided as part of the dash module 42 mounted in the cab of the motor vehicle. Display module is as described above capable of displaying at least alphanumeric messages to provide the operator and diagnostic technician of the motor vehicle with an indication of the operation of the system and a warning of any problems which may arise in the system. The display module may also have the capability of displaying graphical images to graphically display the operation of the system and any problem areas. This would be particularly useful with those controllers which include an interface with an on-board controller used in later models motor vehicles.

Figure 4A:
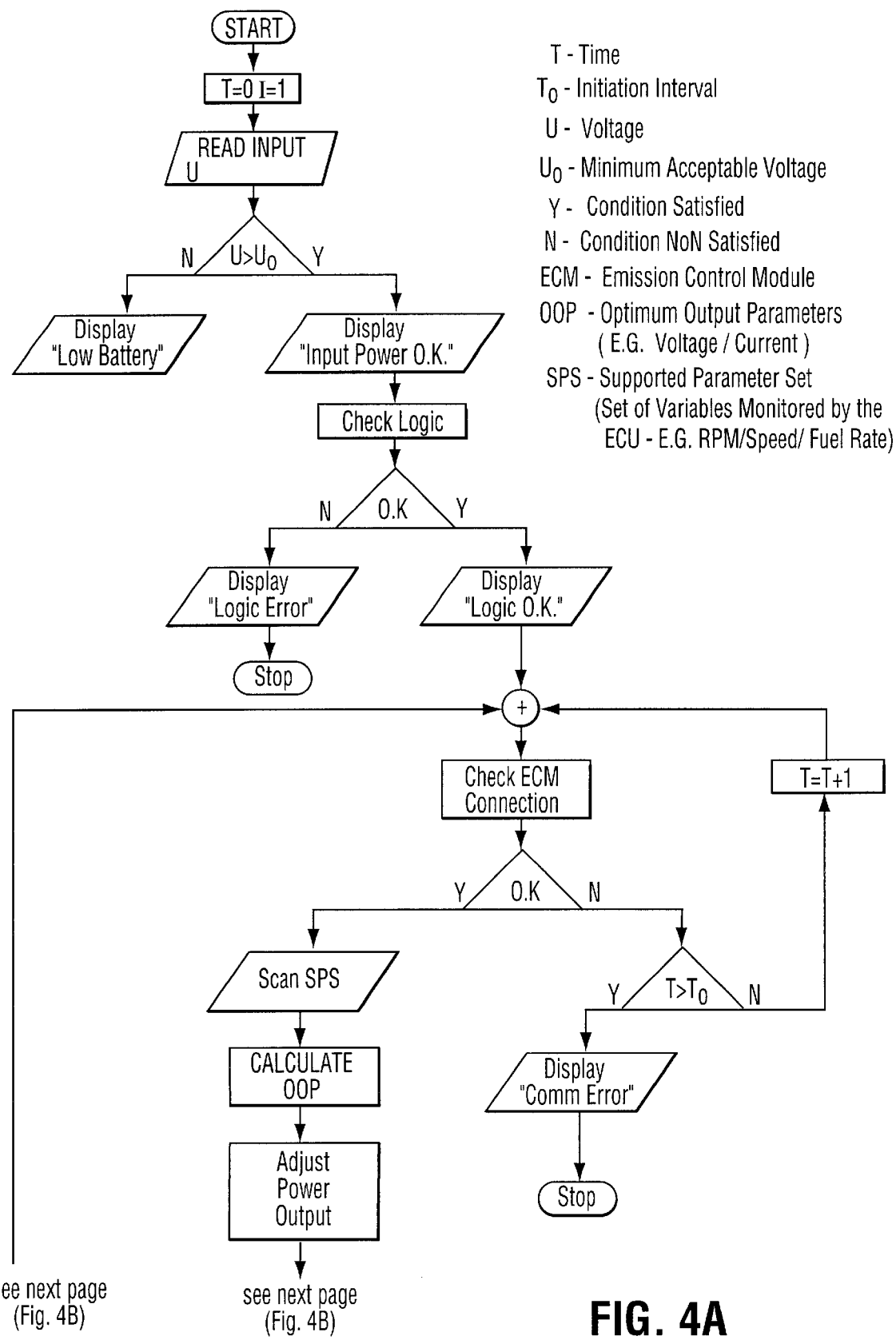
FIG. 4 is a flow chart of the operation of the electronic process controller of FIG. 3.
Figure 4B:
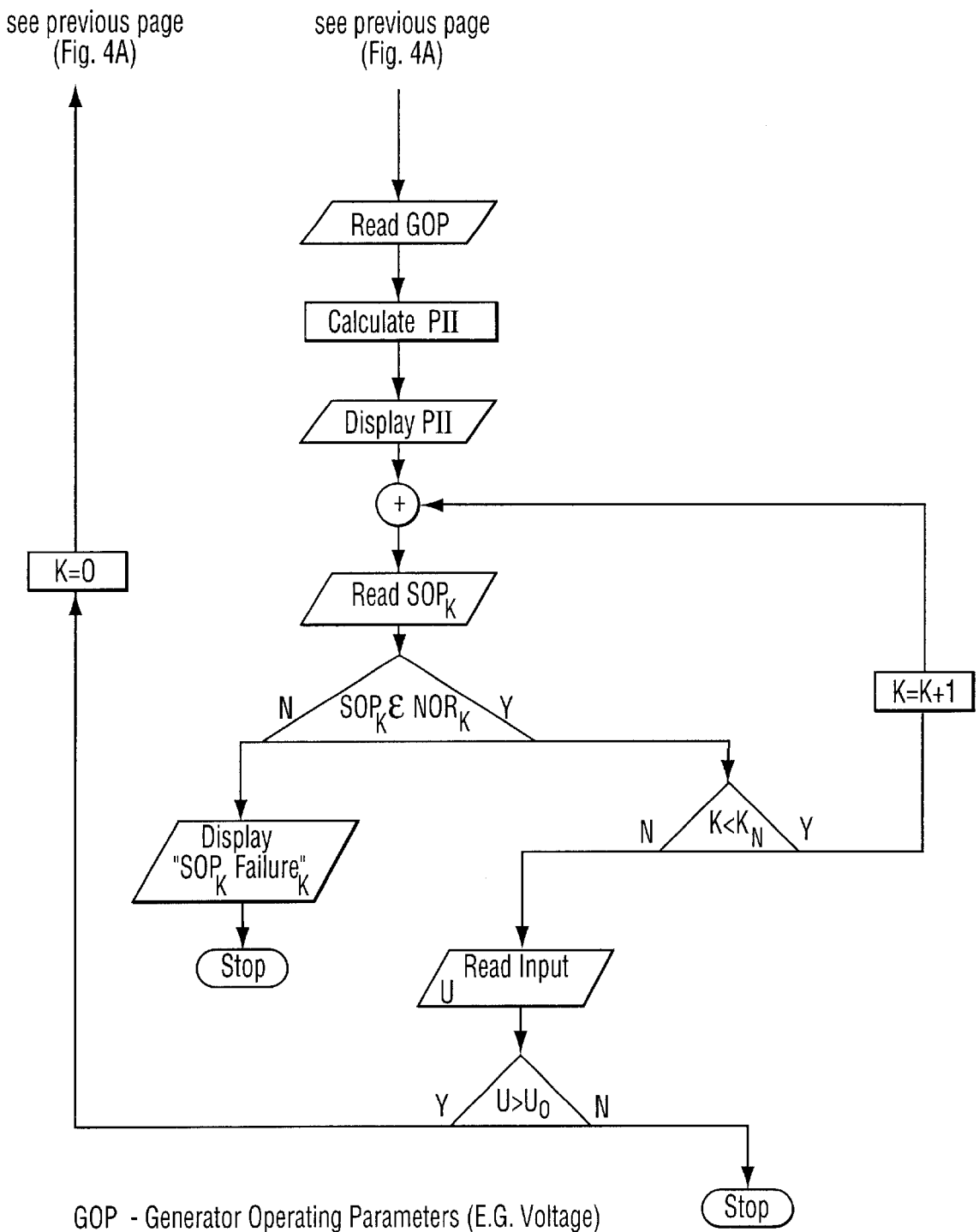

The operation of a preferred embodiment of the controller of the present invention is illustrated in the flow chart of FIG. 4. On startup the controller resets certain of the variables stored in memory for example by setting the time to 0 and the variable for the sensor number to 1 and, if desired, reads values from the non-volatile memory. The controller then reads the level electrical power available for the system preferably by reading the level of the input voltage to determine if the level of the voltage is sufficient for proper operation of the system. While the level of voltage is the simplest to monitor, other indicators of electrical power including current could also be used. If the voltage level is below a preset level, typically about 12 volts, then the controller will display a system failure message such as the "Low Battery" message shown in the Figure on the display and stop operation of the system. If desired, the controller could be programmed to recheck the electrical power level on a preprogrammed interval rather than merely stopping the system. This could be useful if the system was running on an auxiliary power source which may have to be recharged by the main electrical system of the motor vehicle. So long as the electrical power is below the operational level a message would be displayed to indicate this.

If the level of electrical power available for the system is acceptable, then the controller displays that the level is acceptable and proceeds to check the logic circuitry. If the logic circuitry is not functioning properly, then the controller will cause a message to be displayed and will stop operation of the hydrogen generating system. If the logic circuitry is functioning properly, then this will be displayed and the controller proceeds to test the connection with the on-board emission control module if provided. If the connection is not functioning properly, the connection may be retested at preselected intervals for a preselected period of time. If after this retesting, the connection cannot be established, a communication error message is displayed and the system stopped.

Once a successful connection is established with the on-board emission control module, then the specific parameters selected for monitoring are scanned. These parameters can include engine rpm, speed of the vehicle, fuel rate, etc. The optimum operating conditions of the hydrogen generating system are then calculated based upon the capacity of the system and the values of the operating parameters. The power output to the electrolysis cells is then adjusted to achieve the optimum operating condition of the hydrogen generating system. Based upon the operating parameter, the control module may calculate and display a performance impact indicator, such as fuel savings achieved with the hydrogen generating system.

The logic circuitry also reads the values continually from the sensors employed as monitoring means for monitoring the main safety features or operating parameters of the hydrogen generating system. Such safety features or operating parameters include the hood open switch, oil pressure or vacuum level switch, electrolyte level sensor, etc. If a positive signal is received from any of these sensors or if the value from the sensor is not within the normal operating range, the system is automatically shut down.

The controller has stored in memory the identification of the various sensors and includes an indication of the number of such sensors used in the system. The controller uses a count up or count down function to test the sensors in sequence, the controller testing each sensor in sequence and then counting up or down until either the number equal to the total number of sensors or the counter reaches zero. Preferably, the controller uses a count up counter with the total number of sensors stored in memory. As illustrated in FIG. 4, the controller checks the signal from the first sensor, and if the signal is acceptable, displays the message, increments the counter and test the next sensor. This is repeated until all of the sensors have been tested and found acceptable. Should any of the sensors not be functioning properly, the controller displays the failure message and stops operation of the system.

It may be preferred that the operation of the electrolysis cells not be started until the system has checked all of the operating parameters. It may also be preferred if a positive input from the user is required to start the electrolysis operation. In those circumstances, once the controller has tested all of the sensors, the controller could display a message to prompt the user to power on the main hydrogen generating system. The controller would then wait until a signal is received indicating that the main power switch has been turned on. Alternatively, the controller could automatically proceed with power up of the system once the main operating parameters have passed the functional test or a manual override could be instigated by the operator of the system.

Once the signal for main power up is received by the controller, the controller turns on the power supply and then proceeds to monitor the output of the on-board emission control module and the sensors employed as monitoring means to monitor the operating conditions of the hydrogen generating system. These sensors include the level sensor and temperature sensor for monitoring the level and temperature of the solution in the electrolysis cell and for those systems using a pump to introduce the gases into the engine intake system, a pump sensor.

The controller reads the signal from the level sensor to determine the level of solution in the electrolysis cell. If the level is acceptable, the controller proceeds to read the signal from the next sensor monitoring the operating conditions of the hydrogen generating system. If the level of solution in the electrolysis cell is below acceptable levels, then the controller will calculate the amount of distilled or de-ionized water required to be added to the cell to bring the level up to within an acceptable range. The calculation is based upon the shape and overall volume of the electrolysis cell as well as the operating time elapsed since the level initially dropped below the acceptable range. For the preferred embodiment of the electrolysis cells illustrated in the figure being a cylinder of 4 in. diameter, 9 in. height and containing about 1.4 l of electrolyte solution, the formula would be:

Where $t_1$ is elapsed time since the logic signal "not full" received $i=i(t)$ and $T=T(t)$–current and temperature profile over $t \in (0, t_1) \leq 0 \leq t \leq t_1$ The controller monitors the time in hours since the level initially dropped below the acceptable range and utilizes this elapsed time in the formula. If the elapsed time is sufficient to cause the level to decrease to the minimum safety level based upon the operating conditions of the hydrogen generating system, then the controller will stop the operation of the system and display a warning message. In order to properly monitor the elapsed time when the vehicle is being used for intermittent operation, the elapsed time is preferably stored in non-volatile memory.

The controller also monitors the temperature of the solution in the electrolysis cell to maintain the temperature within an acceptable range. As noted above, the acceptable temperature range will vary according to cell design, materials and nature of electrolyte solution. The temperature in the cell should be below 170° F. and preferably below 160° F. If the temperature is above 160° F., then the controller reduces the electrical power to the cell to slow down the electrolysis reaction. Preferably the electrical power to the electrolysis cell is controlled by controlling the current applied to the cell. When the temperature is above 160° F., the controller reduces the current by a factor of 15% and then monitors the temperature to ensure that the temperature decreases to acceptable levels. If the temperature has not decreased within a specified time, typically on the order of 30 minutes, then the controller reduces the current further and continues monitoring the temperature. If the temperature has not reduced after a predetermined number of repetitions or if the temperature ever is above 170° F., the controller stops operation of the system and displays a fault message.

For those hydrogen generating systems which employ a pump for introduction of the gases into the intake system of the engine, the controller also monitors the operation of the pump. Preferably, the controller monitors the operation of the pump by reading a signal corresponding to the current draw of the pump. If the current draw is within a range which indicates proper operation of the pump, then the controller displays this on the display module. If the current draw is not within acceptable range, either being too low, indicating a pump malfunction or too high indicating a pump blockage, then the controller displays a pump failure message and stops operation of the system.

If all of the components of the system are functioning properly as indicated by the signals from the various sensors provided to the controller, the controller will display a System OK message on the display module. The controller continues to monitor both the sensors for the main safety features as well as the sensors for the operating parameters of the system while the system is in operation. So long as all components are functioning properly, the controller continues to display the System OK message. Should the controller determine that one of the components is not functioning properly or is not operating within acceptable range, then the relevant problem message is displayed and the controller carries out the programmed steps in accordance with the problem according to the flow chart shown in FIG. 4. Should one of the main safety sensors indicate a problem, such as the hood open switch indicating that the hood has been opened, then the controller immediately stops the operation of the system and displays the relevant trouble message.

The electronic process controller described above provides for an intelligent performance enhancement system having the ability to determine, produce and deliver optimum quantities of fuel enhancers to the engine. While in the specific embodiment described, the enhancer is hydrogen, the delivery of other enhancers in the form of gaseous, liquid or solid substances such as but not limited to hydrocarbons, alcohols, etc. may also be controlled by the electronic process controller of the present invention.

The electronic process controller of the present invention is also useful in other gas generating systems. In one possible application, the electronic process controller and hydrogen generating system may be used to produce hydrogen gas for use in hydrocracking of petroleum products. In these systems, the controller could monitor the incoming feed stock and the output of the operation and adjust the generation of the hydrogen gas as needed. Other applications of the electronic process controller of the present invention would be apparent to those skilled in the art.

In the preferred embodiment, the present invention describes a hydrogen generating system that uses hydrogen and oxygen gasses to enhance the properties of the fuel obtaining better combustion efficiency resulting in a cleaner burn and better fuel economy. The reliability of an engine outfitted with such system will increase considerably, resulting in a longer life span, delivering more power and exhausting fewer pollutants.

The hydrogen generating system of the present invention provides for a efficient generation of hydrogen and oxygen by electrolysis of water within the electrolysis cell 10. The electrolysis reaction is under the control of the electronic process controller 40 to adjust the rate of the reaction in response to engine conditions. This may be accomplished by regulating the amount of electrical energy provided to the cell 10 to regulate the electrolysis reaction and the amount of gases being generated from the reaction. In addition, the flow control valve 30 may also be an adjustable valve with the flow rate being controlled by the process controller 40. The hydrogen generating system of the present invention may optionally be provided with a separator to separate the hydrogen and oxygen gases given off in the electrolysis reaction, if desired. In this way, the amount of the hydrogen and oxygen gas provided to the engine may be regulated by the electronic process controller 40 to maximize the performance of the engine.

Prototype models of the hydrogen generating system of the present invention were installed on various vehicles including a GMC Suburban, Ford Bronco and Cummins diesel engine for testing purposes. In all cases there was a significant reduction in carbon monoxide emission levels, particularly at engine idle, where the levels decreased up tp 95%. Decreases in the level of the carbon monoxide emissions were observed over the full operating range of the engine and carbon monoxide emissions at some of these levels were so low they were not able to be detected. Similarly, hydrocarbon emission levels were also reduced significantly with reductions as high as 90% being observed. The use of the hydrogen generating system of the present invention also resulted in increased performance of the engines with engine torque shown to increase by as much as 10% and increases of up to 10% in the horse power output of the engine were also observed. Increases in mileage of up to 17% were also observed.

Although various preferred embodiments of the present invention have been described herein in detail, it will be appreciated by those skilled in the art that variations may be made thereto without departing from the spirit of the invention or the scope of the appended claims.

The embodiments of the invention in which an exclusive property or privilege are claimed are as follows:

1. A hydrogen generating system for use in an internal combustion engine for increasing the performance and the efficiency of the engine and decreasing emissions from the engine, the hydrogen generating system comprising:

one or more electrolysis cells for generating hydrogen and oxygen gases by electrolysis of an aqueous solution;

a power source for providing electrical power to the electrolysis cell;

an outlet flow means for delivering and introducing the generated gases into the intake manifold system of an internal combustion engine, the outlet flow means including a gas delivery line, a vacuum pump and a shut-off collector, the shut off collector including an inlet, an outlet, a receptacle into which liquids can drop by gravity from the inlet and a ball contained in the receptacle and capable of floating on the aqueous solution, the outlet including a valve seat into which the ball can seat to substantially seal the outlet against passage of fluids;

a monitoring means for monitoring the operating conditions of the hydrogen generating system including means for detecting a significant change in the pressure or gas in the gas delivery line; and a control means in communication with the monitoring means and operable to shut down the electrolysis cells in response to a significant change in the pressure of the gas in the gas delivery line as created by the ball seating in the valve seat of the shut off collector.

2. The hydrogen generating system of claim 1 wherein the means for detecting a significant change in the pressure of the gas is a sensor reading a signal corresponding to the current draw of the pump.

3. The hydrogen generating system of claim 1 wherein means for detecting a significant change in the pressure of gas in the gas delivery line senses pressure in a portion of the gas delivery line between the electrolysis cells and the shut off valve.

4. A hydrogen generating system for use in an internal combustion engine for increasing the performance and the efficiency of the engine and decreasing emissions from the engine, the hydrogen generating system comprising:

one or more electrolysis cells for generating hydrogen and oxygen gases by electrolysis of an aqueous solution;

a power converter for providing current limited electrical power to the electrolysis cell;

an outlet flow means for introducing the generated gases into the intake manifold system of an internal combustion engine;

a communication unit for displaying system messages to a user;

monitoring means for monitoring the operating conditions of the hydrogen generating system;

control devices for controlling the application of electrical power to the power converter or the flow rate of generated gases; and a process controller having an input/output connection to the vehicles emission control unit, an output connection to the power converter, an input/output connection to the communication unit, an input connection from the monitoring means and an output connection to control devices, the process controller controlling the operation of the power converter and the control devices to optimize performance and safety in response to inputs from the power converter, the vehicle's emission control unit, the communication unit and the monitoring means.

5. The hydrogen generating system of claim 4 wherein the process controller operates in both open and closed loops.

6. The hydrogen generating system of claim 4 wherein the process controller operates using artificial intelligence.

7. The hydrogen generating system of claim 4 wherein the control devices include a means for varying pump speed.

8. The hydrogen generating system of claim 4 wherein the control devices include relays for cutting power to the power converter.

9. The hydrogen generating system of claim 4 wherein the process controller monitors engine conditions via the emission control unit and controls the current profile supplied to the electrolysis cells in response to engine conditions.

10. The hydrogen generating system of claim 4 wherein the power converter is a DC-DC converter.

11. The hydrogen generating system of claim 4 wherein the monitoring means is selected from the group consisting of a sensor for monitoring gas pressure in the outlet flow means, an engine vacuum switch, an engine oil pressure sensor, an electrolyte level sensor or an electrolyte temperature sensor.

12. A hydrogen generating system as in claim 1 further comprising a circuit communicating electrical power from the power source to the electrolysis cell and a means for breaking the circuit from the power source to the electrolysis cells and connecting the electrolysis cells to ground when power is removed from the electrolysis cells by the control means.

13. A hydrogen generating system as in claim 4 further comprising a circuit communicating electrical power from the power source to the electrolysis cell and a means for breaking the circuit from the power source to the electrolysis cells and connecting the electrolysis cells to ground when power is removed from the electrolysis cells by the control means.

14. A process for controlling a hydrogen generating system for use in an internal combustion engine of a vehicle, the hydrogen generating system including one or more electrolysis cells for generating hydrogen and oxygen gases by electrolysis of an aqueous solution; a power converter for regulating electrical power to the electrolysis cell; an outlet flow means for introducing the generated gases into the intake manifold system of an internal combustion engine; a monitoring means for monitoring the operating conditions of the hydrogen generating system, and a control means including a microprocessor connected to the monitoring means for controlling operation of the hydrogen generating system in response to the monitoring means, the process comprising:

receiving input from an emission control unit of the vehicle concerning engine operation; and supplying a control profile to the power converter to vary current output to the electrolysis cells to optimize the generation of gases in response to engine operation.

15. The process for controlling a hydrogen generating system as defined in claim 14 further comprising receiving input from the monitoring means and supplying at control profile to the power converter to vary current output to the electrolysis cells.

16. The process for controlling a hydrogen generating system as defined in claim 14 wherein the outlet flow means includes a pump and the process further comprising adjusting operation of the pump to vary the flow of gases in response to engine operation.

17. The process for controlling a hydrogen generating system as defined in claim 14 further comprising outputting a control profile to the emission control unit to vary operation thereof in response to signals from the monitoring means.

18. The process for controlling a hydrogen generating system as defined in claim 14 wherein the inputs are selected from the group comprising engine rpm, speed, mass air flow or throttle position.

19. The process for controlling a hydrogen generating system as defined in claim 14 further comprising logging data from the received inputs for monitoring performance of the vehicle.

20. The process for controlling a hydrogen generating system as defined in claim 14 further comprising logging data from the control profile for monitoring performance of the hydrogen generating system.

* * * * *